(12) United States Patent
Carter et al.

(10) Patent No.: US 11,118,368 B2
(45) Date of Patent: Sep. 14, 2021

(54) LAMINAR WATER FEATURE

(71) Applicant: Hayward Industries, Inc., Berkeley Heights, NJ (US)

(72) Inventors: James Carter, Warren, RI (US); Danny Raposo, Lincoln, RI (US); Kevin Potucek, Far Hills, NJ (US); Gregory Fournier, West Kingston, RI (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 67 days.

(21) Appl. No.: 16/016,442

(22) Filed: Jun. 22, 2018

(65) Prior Publication Data

US 2019/0390473 A1 Dec. 26, 2019

(51) Int. Cl.
| | |
|---|---|
| E04H 4/14 | (2006.01) |
| B05B 1/02 | (2006.01) |
| B05B 17/08 | (2006.01) |
| E04H 4/12 | (2006.01) |
| F21V 7/00 | (2006.01) |
| F21V 33/00 | (2006.01) |
| F21W 121/02 | (2006.01) |

(52) U.S. Cl.
CPC .............. *E04H 4/148* (2013.01); *B05B 1/02* (2013.01); *E04H 4/12* (2013.01); *F21V 7/0091* (2013.01); *F21V 33/008* (2013.01); *F21W 2121/02* (2013.01)

(58) Field of Classification Search
CPC .. E04H 4/12; E04H 4/148; B05B 1/02; B05B 1/3402; B05B 17/08; B05B 15/40; F21W 2121/02

USPC ................................................. 239/18; 362/96
See application file for complete search history.

(56) References Cited

U.S. PATENT DOCUMENTS

| | | | | |
|---|---|---|---|---|
| 2,687,915 | A * | 8/1954 | Keech ....................... | F21S 8/00 239/18 |
| 2,739,842 | A * | 3/1956 | Andrews ................... | B05B 1/20 239/450 |
| 4,871,092 | A * | 10/1989 | Maerte ................ | B05B 11/3008 222/153.13 |
| 4,955,540 | A | 9/1990 | Fuller et al. | |
| 5,078,320 | A | 1/1992 | Fuller et al. | |

(Continued)

FOREIGN PATENT DOCUMENTS

| | | |
|---|---|---|
| CN | 207271516 U | 4/2018 |
| JP | H08243453 A | 9/1996 |

OTHER PUBLICATIONS

Pentair Water Pool and Spa, MagicStream Laminar Installation and Users Guide, P/N 590033—Rev B, Jun. 2008 (20 pages).

(Continued)

*Primary Examiner* — Joseph A Greenlund
(74) *Attorney, Agent, or Firm* — McCarter & English, LLP

(57) ABSTRACT

A laminar water feature is provided which includes a housing having a deck niche, a niche collar, a spacer ring, and a lid, a laminar vessel having an inlet, an annular pocket, a vertical baffle, a horizontal baffle, a light pipe, a plurality of screens, a cap having an outlet, and threading within an isolated light chamber for removably accepting a lighting source, and a pivot adjustment bracket having a handle with push button assembly, ridge, and detent configuration for fixedly rotatably adjusting the angle of the laminar vessel.

14 Claims, 14 Drawing Sheets

(56) References Cited

U.S. PATENT DOCUMENTS

| | | | |
|---|---|---|---|
| 5,115,973 A | 5/1992 | Fuller et al. | |
| 5,160,086 A | 11/1992 | Kuykendal et al. | |
| 5,207,499 A * | 5/1993 | Vajda | A61H 33/6063 |
| | | | 239/18 |
| 5,432,688 A * | 7/1995 | Tobias | F21V 25/00 |
| | | | 362/101 |
| 5,641,120 A | 6/1997 | Kuykendal et al. | |
| 5,749,518 A | 5/1998 | Wang | |
| 5,931,382 A * | 8/1999 | Gross | B05B 17/08 |
| | | | 239/17 |
| 5,979,791 A | 11/1999 | Kuykendal et al. | |
| 5,992,761 A | 11/1999 | Santa Cruz et al. | |
| 6,076,741 A | 6/2000 | Dandrel et al. | |
| 6,471,146 B1 | 10/2002 | Kuykendal et al. | |
| 6,484,953 B2 | 11/2002 | Freier | |
| 6,491,407 B1 * | 12/2002 | Beadle | F21S 8/022 |
| | | | 362/153 |
| 6,533,191 B1 * | 3/2003 | Berger | B05B 17/08 |
| | | | 239/12 |
| 6,595,675 B2 | 7/2003 | Dongo | |
| 6,634,762 B2 | 10/2003 | Cilia | |
| 6,860,624 B2 * | 3/2005 | Hille | F21S 8/022 |
| | | | 362/153.1 |
| 7,182,477 B1 | 2/2007 | Hartz | |
| 7,264,176 B2 * | 9/2007 | Johnson | B05B 12/06 |
| | | | 239/22 |
| 7,384,165 B2 | 6/2008 | Doyle | |
| 7,422,342 B2 | 9/2008 | Nanni et al. | |
| 7,482,764 B2 | 1/2009 | Morgan et al. | |
| 7,553,039 B2 | 6/2009 | Harris et al. | |
| 7,584,908 B2 | 9/2009 | Swan et al. | |
| 7,604,364 B2 | 10/2009 | Walker et al. | |
| 7,698,754 B2 | 4/2010 | Kunkel | |
| 7,699,489 B2 | 4/2010 | Hagen | |
| 7,744,013 B2 | 6/2010 | Johnson | |
| 7,806,550 B2 | 10/2010 | Tyson et al. | |
| 7,845,579 B2 * | 12/2010 | Johnson | B05B 12/06 |
| | | | 239/17 |
| 8,042,748 B2 | 10/2011 | Hagaman | |
| 8,177,141 B2 | 5/2012 | Hagaman | |
| 8,177,148 B1 | 5/2012 | Renquist et al. | |
| 8,215,569 B2 | 7/2012 | Johnson | |
| 8,251,405 B2 * | 8/2012 | Brune | A01K 63/04 |
| | | | 285/11 |
| 8,333,331 B1 * | 12/2012 | Fuller | B05B 1/265 |
| | | | 239/17 |
| 8,366,016 B2 * | 2/2013 | Simpson | B05B 1/14 |
| | | | 239/17 |
| 8,459,573 B2 * | 6/2013 | Wiseman | B05B 15/00 |
| | | | 239/17 |
| 8,464,964 B2 * | 6/2013 | Wiseman | B05B 17/08 |
| | | | 239/17 |
| 8,500,037 B2 * | 8/2013 | Li | E04H 4/169 |
| | | | 239/17 |
| 8,523,087 B2 | 9/2013 | Hagaman | |
| 8,567,696 B2 * | 10/2013 | Walker | B05B 15/74 |
| | | | 239/203 |
| 8,622,247 B2 * | 1/2014 | Zuloff | F41B 9/0037 |
| | | | 222/113 |
| 8,636,227 B2 | 1/2014 | Johnson | |
| 8,641,214 B1 | 2/2014 | Batchko | |
| 8,763,925 B2 | 7/2014 | Johnson | |
| 9,027,848 B1 | 5/2015 | Hilton et al. | |
| 2003/0010836 A1 * | 1/2003 | Pham | B05B 1/3402 |
| | | | 239/17 |
| 2003/0111554 A1 | 6/2003 | Howlett et al. | |
| 2004/0050958 A1 * | 3/2004 | McKenzie | B05B 3/0431 |
| | | | 239/242 |
| 2006/0002104 A1 * | 1/2006 | Willis | F21V 25/00 |
| | | | 362/101 |
| 2006/0002105 A1 | 1/2006 | Hinojosa, Jr. | |
| 2006/0163374 A1 * | 7/2006 | Wooten | B05B 17/08 |
| | | | 239/18 |
| 2006/0163375 A1 * | 7/2006 | Skluzacek | B05B 17/08 |
| | | | 239/18 |
| 2006/0175423 A1 | 8/2006 | White et al. | |
| 2006/0243819 A1 * | 11/2006 | Beidokhti | F21V 29/51 |
| | | | 239/18 |
| 2007/0008713 A1 * | 1/2007 | Doyle | F21V 23/0407 |
| | | | 362/101 |
| 2008/0163641 A1 | 7/2008 | Mitchell | |
| 2009/0289577 A1 | 11/2009 | Thursfield et al. | |
| 2010/0155497 A1 * | 6/2010 | Hagaman | B05B 15/62 |
| | | | 239/12 |
| 2010/0155498 A1 * | 6/2010 | Hagaman | E04H 4/12 |
| | | | 239/12 |
| 2010/0276519 A1 * | 11/2010 | Lee | B05B 1/185 |
| | | | 239/553 |
| 2010/0288852 A1 | 11/2010 | Gilmore | |
| 2011/0042489 A1 * | 2/2011 | Johnson | F21S 8/00 |
| | | | 239/407 |
| 2011/0073670 A1 * | 3/2011 | Johnson | B05B 17/08 |
| | | | 239/18 |
| 2011/0240757 A1 * | 10/2011 | Selk | B05B 17/08 |
| | | | 239/18 |
| 2012/0037235 A1 | 2/2012 | Hagaman | |
| 2012/0267456 A1 * | 10/2012 | Imagawa | B05B 15/652 |
| | | | 239/569 |
| 2014/0117107 A1 | 5/2014 | Vogtner et al. | |
| 2014/0312139 A1 * | 10/2014 | Fuller | B05B 17/08 |
| | | | 239/17 |
| 2015/0102126 A1 | 4/2015 | Russell et al. | |
| 2016/0121357 A1 * | 5/2016 | Fossen | F21V 33/006 |
| | | | 239/18 |
| 2016/0122208 A1 * | 5/2016 | Denkewicz | C02F 1/325 |
| | | | 210/748.11 |
| 2017/0130477 A1 * | 5/2017 | Marshall | E04H 4/14 |
| 2017/0234517 A1 * | 8/2017 | Highbridge | F21V 21/047 |
| | | | 362/427 |
| 2017/0326574 A1 * | 11/2017 | Ding | F21S 6/00 |
| 2018/0080449 A1 * | 3/2018 | Parcell | F04D 29/406 |
| 2019/0390473 A1 * | 12/2019 | Carter | F21V 7/0091 |
| 2020/0023386 A1 * | 1/2020 | Sturdy | B05B 1/14 |

OTHER PUBLICATIONS

MagicStream Laminars by Pentair Water Pool and Spa, Product Features data sheet, Part # PI-062, Mar. 2009 (2 pages).
PCT Invitation to Pay Additional Fees, dated Aug. 22, 2019, issued in connection with International Application No. PCT/US2019/38465 (2 pages).
International Search Report and Written Opinion of the International Searching Authority, dated Oct. 9, 2019, issued in connection with International Application No. PCT/US2019/38465 (14 pages).
Zodiac Pool Systems, Inc., Jandy Laminar Jet Installation and Operation Manual, 2009 (16 pages).

* cited by examiner

LAMINAR WATER FEATURE

BACKGROUND OF THE INVENTION

Field of Disclosure

The present disclosure relates to a laminar water feature, and more particularly, relates to a laminar water feature that allows a user to safely and easily adjust a laminar water stream without having to deactivate the water feature, and still more particularly, to a laminar water feature having a modular design that allows for installation of a lighting source to illuminate the laminar water stream.

Related Art

Laminar water features are currently utilized in the pool and spa industry by owners desiring to add a decorative water feature to compliment their pool or spa. These water features may be implemented in a wide variety of applications such as residential and commercial pools, spas, fountains, and the like. In a typical installation, a laminar water feature device is installed around a periphery of a body of water, the device being installed either above or below grade. The laminar water feature receives a volume of water through an inlet in the device, the volume of water typically being provided by a pump that draws water from the body of water. The volume of water is passed through the device and forced through an outlet, providing a column of water. The laminar water feature is typically oriented such that the column of water produces an arc originating at the device and terminating in the body of water.

When a fluid is flowing through a closed channel such as a pipe, two types of flow may occur, laminar flow, or turbulent flow. Laminar flow occurs when a fluid flows in parallel layers, with no disruption between the layers. The fluid tends to flow without lateral mixing, and adjacent layers slide past one another. There are no cross-currents perpendicular to the direction of flow, nor eddies or swirls of fluids. Conversely, turbulent flow is a less orderly flow, characterized by eddies or small packets of fluid particles which result in lateral mixing. Visually, laminar flow is characterized by a smooth glass-like appearance, whereas turbulent flow appears rough and cloudy. Further, as applied to a water feature as described above, laminar flow produces a more uniform, continuous, and visually appealing column of water. Accordingly, it is desirable to produce a laminar column of water from the water feature. To further increase the visual appeal of the water feature, laminar water features may additionally include a lighting source.

Current devices suffer from a variety of shortcomings. For example, while some devices include a lighting source to illuminate the laminar water column, this illumination is often difficult to perceive because of the fiber-optic-like properties of the column, producing minimal angular light scatter. Accordingly, there remains a need to provide a laminar water feature that can "roughen" the exterior of the laminar column.

Additionally, as mentioned above, some laminar water features may include a lighting source. However, these devices typically permanently affix the lighting device to the laminar flow device. This is undesirable as many users might not need, or want, the water feature to be illuminated and do not wish to pay for a feature they will not use. Conversely, users who do not initially purchase a unit with an integrated lighting source must purchase a new unit with an integrated lighting unit should their needs and/or desires change in the future. Further still, should the lighting source need maintenance or replacement, the entire laminar water feature would need to either be removed or replaced. Accordingly, there remains a need to provide a laminar water feature that can easily accept a new or replacement lighting source.

Further, some laminar water features rely on brackets to secure the device at a particular angle based on a desired height and throw of the laminar water column arc. The brackets may provide for rotational and angular adjustment of the laminar water column. The laminar flow devices and brackets may be adjustably secured by way of friction fittings, pressure fittings, snap fittings or the like, or the devices can be fixedly secured by way of screws, bolts, rivets, or the like. However, when the angle of a laminar flow device is adjustably secured by any of the means listed above, it is likely that over time the angle of the laminar device will change as a result of vibrations caused by variations in fluid pressure and volume. Alternatively, when the angle of a laminar flow device is fixedly secured by the means listed above, the device must be deactivated and the proper tools must be selected before the angle can be adjusted. Accordingly, there remains a need to provide a laminar water feature that reliably secures the laminar device at a desired angle and that can easily be adjusted without the need for tools or without having to deactivate the device.

Laminar water features can be installed below grade to obscure the structure of the device and thus provide a more aesthetically pleasing appearance. Typically, a laminar flow device is seated in a housing and is covered with a lid, with the lid being positioned at grade. However, depending on factors such as installation depth of the housing and decking material, the surface of the lid may not properly align with the surrounding decking. If the lid does not align properly, the only option currently available is to either reinstall the housing or alter the surrounding decking. Neither option is ideal and may be cost prohibitive. Accordingly, there remains a need to provide a laminar water feature having a housing with a lid that can be easily adjusted to align with the surface of the decking.

SUMMARY OF THE INVENTION

The present disclosure relates to a laminar water feature. The laminar water feature generally includes a housing with a laminar vessel and a pivot adjustment bracket arranged therein. The housing includes a deck niche, a niche collar, a spacer ring, and a lid. The niche collar is received by and is supported by an upper flange of the deck niche. The collar includes a plurality of adjustment notches for receiving increment posts of the spacer ring, thereby adjusting the height of the lid of the housing.

The laminar vessel includes a body, a cap having an outlet, a plurality of screens, a bottom seal plate, a light pipe, an upper baffle member, and a union ring. The body receives the bottom seal plate, light pipe, upper baffle member, and screens. The cap and the union ring are sealingly secured to the body, thereby providing a liquid-tight laminar flow vessel. The laminar flow vessel is rotatably coupled to a pivot adjustment bracket having pivot members and a push button assembly, rib, and detent configuration for rotatably securing the laminar flow vessel. The laminar vessel and pivot adjustment bracket are supported within the housing by pivot members that hang from an inner flange of the niche collar.

In operation, water circulates through the laminar vessel and is forced out of an opening in the cap, thereby producing a laminar column of water. More specifically, water enters the laminar vessel through an inlet, circulates around an annular pocket adjacent the inlet, passes through a first vertical baffle, passes through a second horizontal baffle, and passes through the plurality of screens before finally being forced through the outlet. An adjustment valve is coupled to the inlet of the laminar vessel for adjusting the volumetric flow rate of the water as it enters the laminar vessel. In some embodiments the laminar vessel can be provided with a lighting source for illuminating the laminar water column. The cap can also be provided with an adjustable laminar scratcher for disrupting the surface of the laminar water column, thereby enhancing the visibility of the illuminated laminar water column. According to other aspects of the present disclosure, the laminar water feature could be provided with a laminar flow disruption assembly, which disrupts the surface of the laminar column of water by injecting a thin stream of water into the laminar column of water.

The present disclosure also relates to a method for adjusting the maximum height and throw of the laminar water feature. The method includes the steps of rotating the laminar vessel so that the column of water is directed toward a desired point of termination, adjusting the valve to achieve a desired volumetric flow rate of the laminar column of water, adjusting the angle of the laminar vessel by depressing the push button assembly, rotating the laminar vessel to a desired angle, and releasing the push button assembly, thereby selecting a detent of the adjustment band, and repeating the aforementioned steps until a desired maximum height y and maximum throw x are achieved.

BRIEF DESCRIPTION OF THE DRAWINGS

The foregoing features of the disclosure will be apparent from the following Detailed Description, taken in connection with the accompanying drawings, in which.

DETAILED DESCRIPTION OF THE INVENTION

The present disclosure relates to a laminar water feature and methods for using same, as discussed in detail below in connection with FIGS. 1-16.

Figure 1:
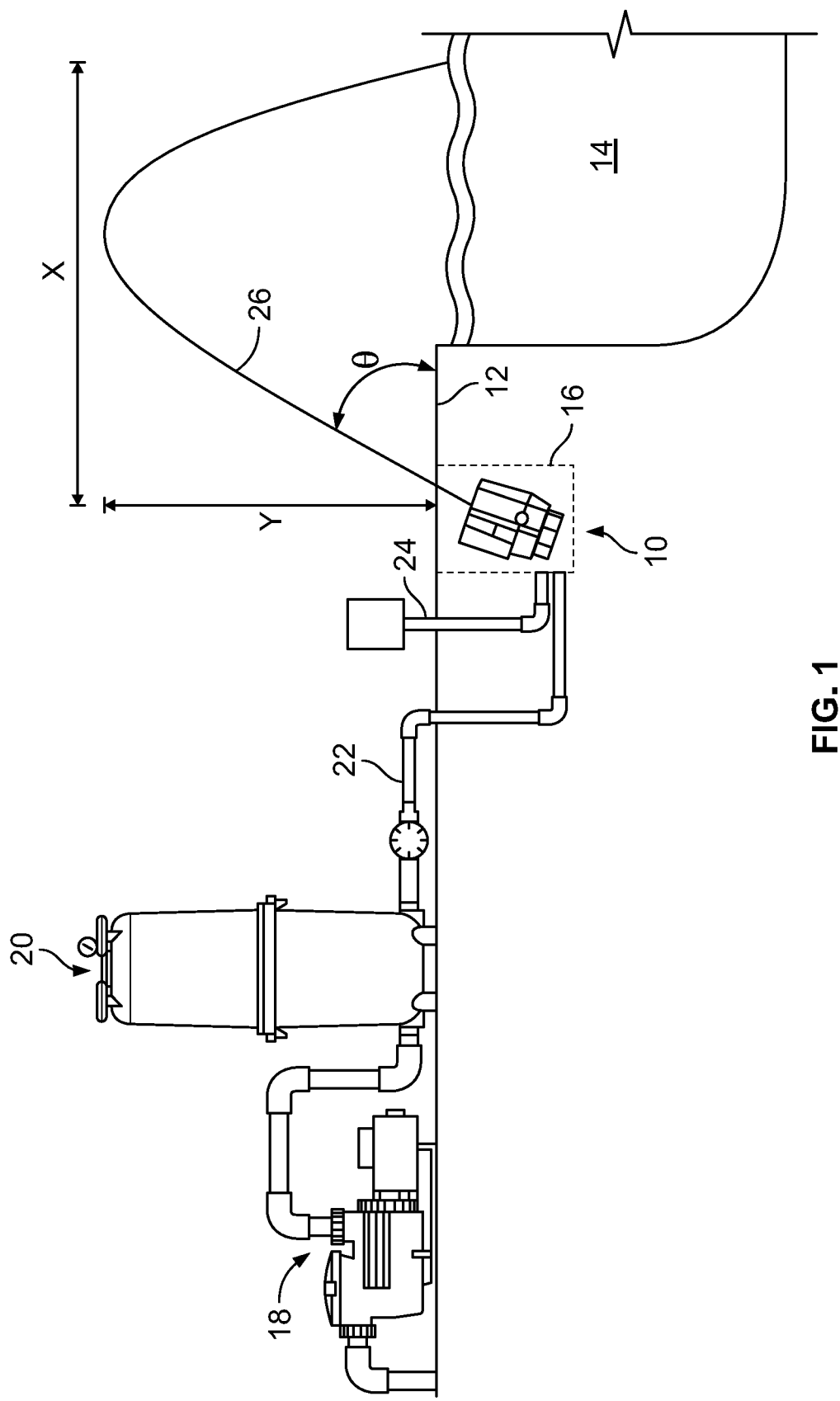
FIG. 1 is a side elevation view of a laminar water feature according to the present disclosure shown in an installed configuration about a body of water.

FIG. 1 is a side elevation view of the laminar water feature of the present disclosure, shown generally at 10. The laminar water feature 10 is shown in an installed configuration flush with decking 12 about a body of water 14 such as a residential or commercial pool, spa, fountain, or the like. While the laminar water feature 10 is shown installed below grade in a cavity 16 within the decking 12, thus concealing its operation and adding to general aesthetic appeal, the laminar water feature 10 can be installed either below, or above grade. According to certain aspects of the present disclosure, water is drawn from the body of water 14 with a pump 18 and moves through an optional filter 20 before passing through a water conduit 22 and entering the laminar water feature 10 through an inlet 74 in the device (shown in FIG. 2). The volume of water is passed through the laminar water feature 10 and forced through an outlet 82 (see FIG. 4), providing a column of water 26. The laminar water feature 10 is oriented such that the column of water 26 leaves the laminar water feature 10 at an angle Θ and produces an arc originating at the laminar water feature 10 and terminating in the body of water 14. Further, the laminar water feature 10 is adjustable (discussed hereinbelow) such that angle Θ can be modified so as to yield an arc with an appropriate maximum throw x and maximum height y to compliment a particular application. While only a single laminar water feature 10 is shown located about the body of water 14, it should be appreciated that more that one laminar water feature 10 located about the body of water 14 can be installed.

Figure 2:
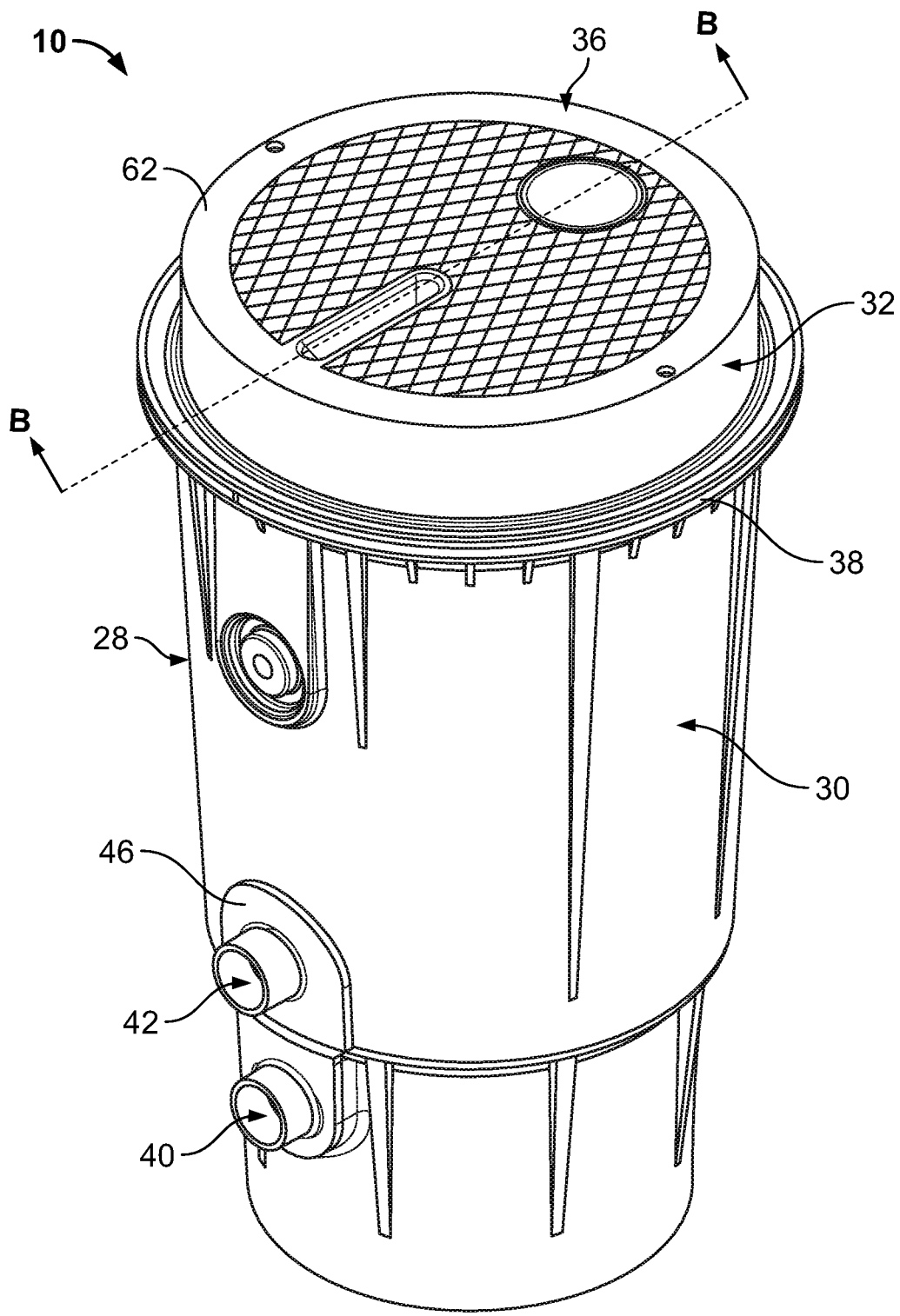
FIG. 2 is a perspective view of the laminar water feature of FIG. 1.
Figure 3:
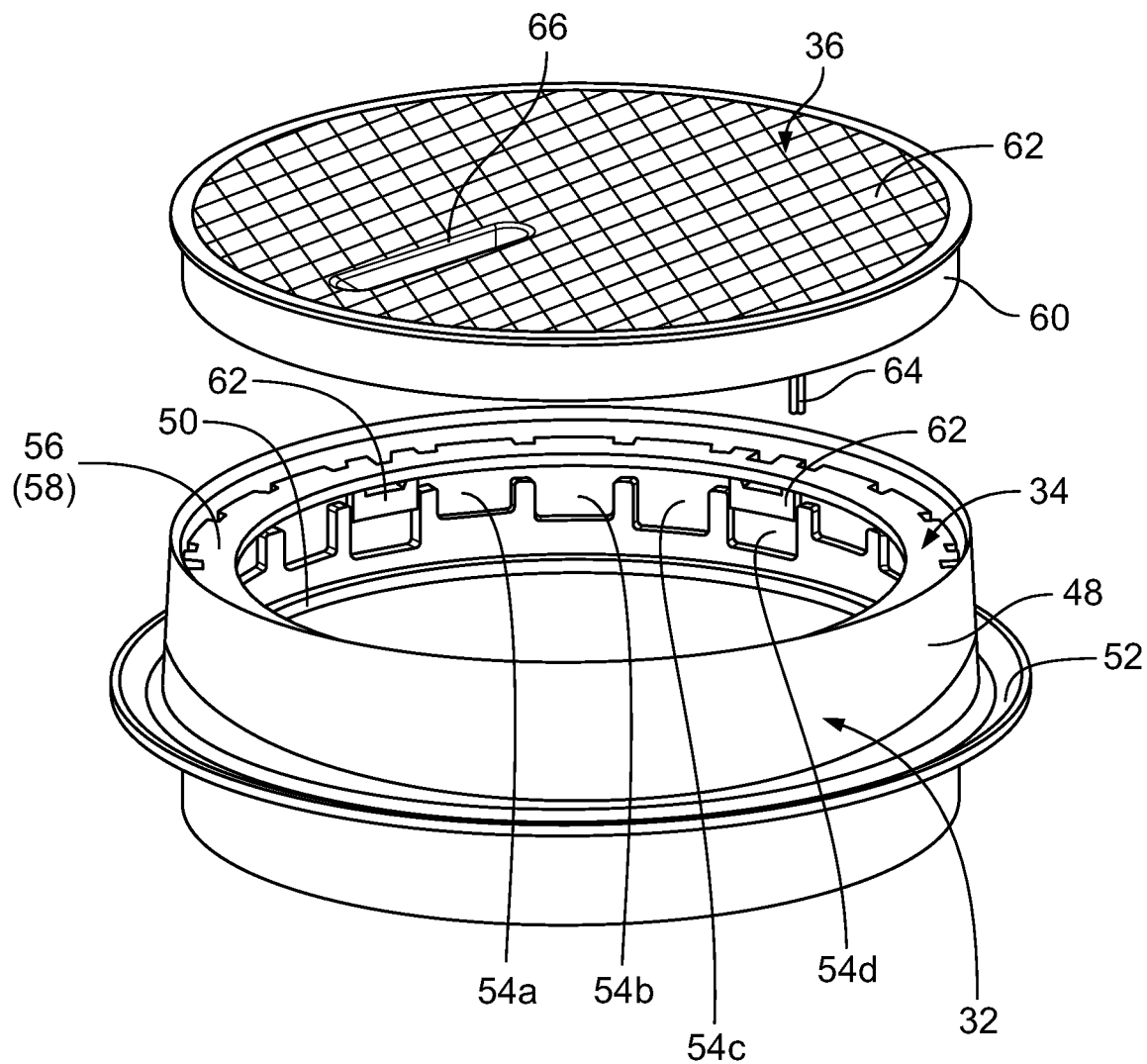
FIG. 3 is a partial exploded view of the housing of the laminar water feature of FIG. 1.

FIG. 2 is a perspective view of the laminar water feature 10 of the present disclosure illustrating a housing 28. FIG. 3 is a partial exploded view of the housing 28 of the laminar water feature 10. Accordingly, FIGS. 2 and 3 will be referred to jointly. The housing 28 of the laminar water feature 10 includes a deck niche 30, a niche collar 32, a spacer ring 34, and a lid 36. The deck niche 30 is a vertically oriented and substantially hollow cylindrical vessel having an upper flange 38 extending radially from the center of the deck niche 30. A water conduit entry port 40, electrical conduit entry port 42, and a drainage port 44 (see FIG. 11) are disposed in the substantially cylindrical vertical wall of the deck niche 30. The deck niche 30 can also include one or more adapters 46 that are sized and shaped to be received by the water conduit entry port 40 and the electrical conduit entry port 42 and sized and shaped to receive electrical conduit 24 (not shown) and water conduit 22 (not shown) having varying diameters.

The niche collar 32 is also vertically oriented and substantially cylindrical. The niche collar 32 includes a collar wall 48, an inner collar flange 50 extending radially toward the center of the niche collar 32, an outer collar flange 52 extending radially from the center of the niche collar 32, and a plurality of adjustment notches 54 a-d disposed circumferentially about an inner surface of the collar wall 48, above the inner collar flange 50. The outer diameter of the collar wall 48 is sized and shaped to be received by the deck niche 30. The plurality of adjustment notches 54 *a-d* are of varying depths and are sized and shaped to receive increment posts 62 of a spacer ring 34 (see FIG. 3). Multiple adjustment notches 54 *a-d* having the same depth, preferably at least three (3) and still more preferably six (6), can be uniformly annularly disposed around the niche collar 32 so as to provide a stable base for the spacer ring 34 and lid 36. While the adjustment notches 54 *a-d* can be provided having a multitude of depths, it is preferable that the adjustment notches 54 *a-d* have four (4) distinct depths. It is also preferable that the adjustment notches are provided having depths varying by increments of 0.125 inches (e.g., thereby providing for a total adjustment of 0.375 inches).

The spacer ring 34 includes a top surface 56 and a bottom surface 58 and a plurality of increment posts 62 sized and shaped to be received by the adjustment notches 54 *a-d* of the niche collar 32. Preferably, at least three (3), and still more preferably six (6), increment posts 62 are disposed circumferentially and uniformly on the bottom surface 58 of the spacer ring 34, providing a stable base for the lid 36. Further, the increment posts 62 can be sized an shaped so as to have a height substantially equal to the adjustment notches 54, a-d having the greatest depth (e.g., adjustment notch 54*d* shown in FIG. 3).

The lid 36 can include a substantially cylindrical lid wall 60 having an outer diameter sized to be received by the niche collar 32, an annular lid surface 62, a water column aperture 66 disposed through the lid surface 62, and an alignment post 64. The water column aperture 66 is sized and shaped to accommodate the column of water 26 produced by the laminar water feature 10 at any angle Θ between minimum and maximum adjustment positions. Accordingly, the water column aperture 66 has an elongate geometry.

In use, the deck niche 30 receives the niche collar 32. The outer diameter of the niche collar wall 48 aligns with and is received by the deck niche 30 and the outer collar flange 52 of the niche collar 32 rests on the upper flange 38 of the deck niche 30, thereby supporting the niche collar 32. The outer diameter of the spacer ring 34 aligns with and is received by the niche collar 32, the adjustment notches 54 *a-d* of the of the niche collar 32 receiving the increment posts 62 of the spacer ring 34, supporting the spacer ring 34 within the niche collar 32. The lid 36 is also received by the niche collar 32, the outer diameter of the lid wall 60 aligning with and being received by the collar wall 48. The lid wall 60 rests on the top surface 56 of the spacer ring 34, thus supporting the lid 36 at a height relative to the niche collar 32 that is defined by the placement of the increment posts 62 in the adjustment notches 54 *a-d* of a particular user-selected depth. As discussed hereinabove, it is often the case that the height of the lid surface 62 of the housing 28 may not properly align with the decking 12 surrounding a body of water 14. Accordingly, a user may adjust the height of the lid 36 of the laminar water feature 10 of the present disclosure by simply inserting the increment posts 62 of the spacer ring 34 into the adjustment notches 54 *a-d* of the collar having the desired depth and thus defining the height of the lid surface 62.

Figure 4:
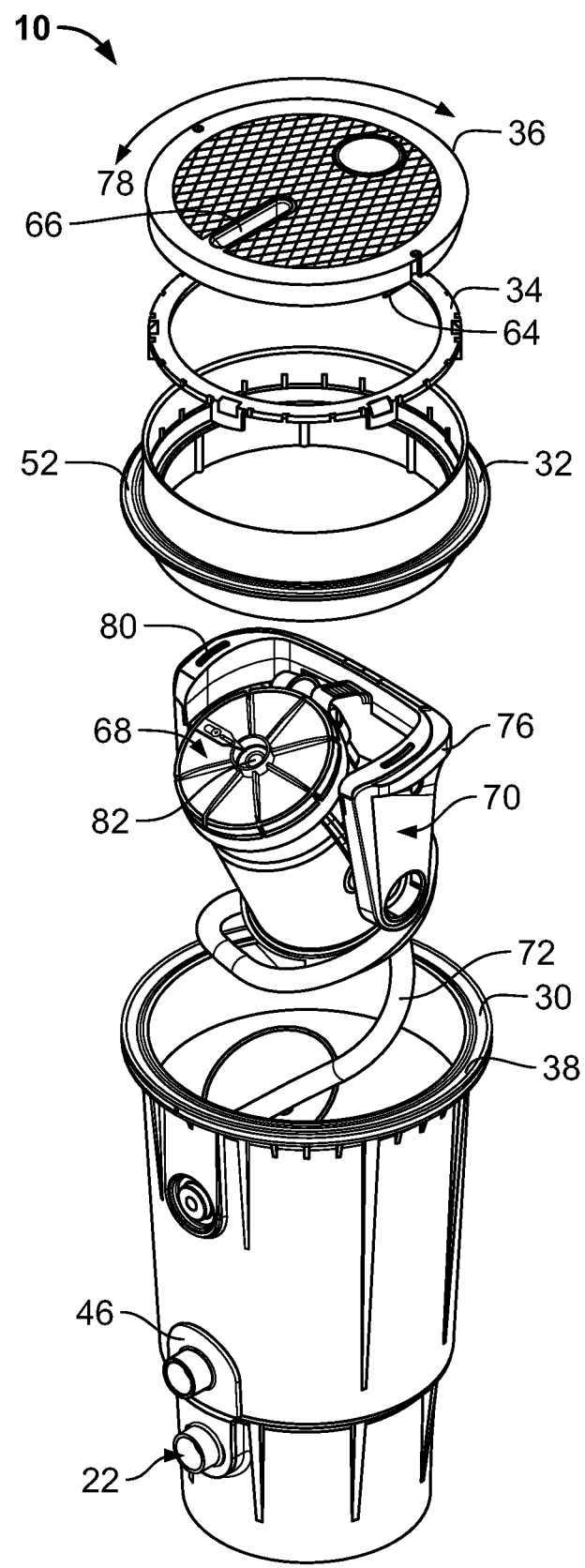
FIG. 4 is an exploded view of the laminar water feature of FIG. 1.

FIG. 4 is an exploded view of the laminar water feature 10 of the present disclosure including the lid 36, the spacer ring 34, the niche collar 32, a laminar vessel 68, a pivot adjustment bracket 70, a flexible hose 72, the deck niche 30, and the adapter 46. As discussed above, the niche collar 32 is received by the deck niche 30 and the outer collar flange 52 of the niche collar 32 rests on the upper flange 38 of the deck niche 30, supporting the niche collar 32. The laminar vessel 68 is pivotably coupled to the pivot adjustment bracket 70, discussed in greater detail hereinbelow. The flexible hose 72 is coupled to the water conduit 22 and the inlet 74 of the laminar vessel 68 (see FIG. 6), providing fluid communication therebetween. The laminar vessel 68, pivot adjustment bracket 70, and flexible hose 72 are received by the deck niche 30 and supported by outwardly extending lips 76 of the pivot adjustment bracket 70 that engage the inner collar flange 50 of the niche collar 32. The pivot adjustment bracket 70 is rotatably seated on the inner collar flange 50 allowing the pivot adjustment bracket 70 and the laminar vessel 68 to rotate about the inner collar flange 50 in the direction indicated by double sided arrow 78. The spacer ring 34 and housing lid 36 are received by the niche collar 32 as described hereinabove. In addition, the alignment posts 64 of the housing lid 36 engage alignment features 80 disposed in the pivot adjustment bracket 70, the alignment features 80 being sized and shaped to receive the alignment posts 64. The engagement of the alignment posts 64 with the alignment features 80 serves to rotationally align the water column aperture 66 of the lid 36 with the outlet 82 of the of the laminar vessel 68 so that the column of water 26 originating therefrom unobstructedly passes through the water column aperture 66.

Figure 5:
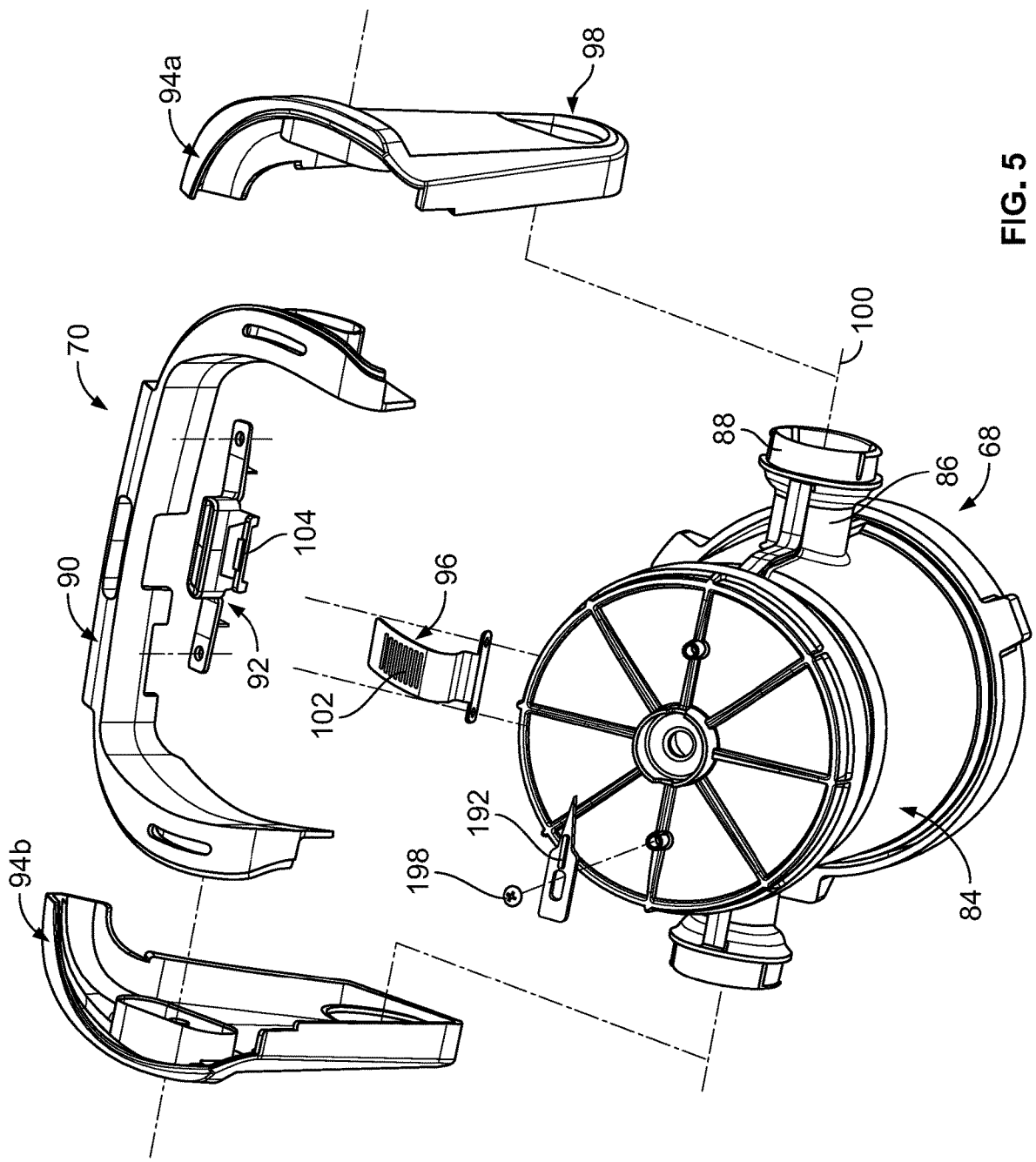
FIG. 5 is a partial exploded view of a pivot adjustment bracket and a laminar vessel of the laminar water feature of FIG. 1.

FIG. 5 is an exploded view of a pivot adjustment bracket 70 and a laminar vessel 68 of the laminar water feature 10. The laminar vessel 68 includes a body 84 having pivot projections 86 extending outward and normal to the body 84, the pivot projections 86 having annular shoulders 88 for rotatably engaging the pivot adjustment bracket 70. The pivot adjustment bracket 70 includes a handle 90 having a push button assembly 92, pivot members 94 *a,b*, and an adjustment band 96. The pivot members 94 *a,b* include apertures forming collars 98, the collars 98 being secured to the shoulders of the pivot projections 86 with a snap, or press fit, connection, thereby providing for rotational translation about an axis 100 through the pivot projections 86, shoulders 88, and collars 98. The handle 90 is disposed between and coupled to the pivot members 94 *a,b*, providing additional structural support for the pivot adjustment bracket 70 as well as housing the push button assembly 92. The handle 90 can be coupled to the pivot members 94 *a,b* with any of a number of means for securely joining the components including press or snap fits, adhesives, screws, bolts, rivets, or the like. The adjustment band 96 includes a plurality of detents 102 and is coupled to the body 84 of the laminar vessel 68 and arranged such that the detents 102 are engaged by a ridge 104 of the push button assembly 92 located in the handle 90. The adjustment band 96 can be coupled to the body 84 of the laminar vessel 68 with any of a number of means for securely joining the components including adhesives, screws, bolts, rivets, or the like. The push button assembly 92 can be configured to have a normally closed position. In the normally closed position the ridge 104 of the push button assembly 92 is disposed through and engages one of the plurality of detents 102 of the adjustment band 96, securing the angular position of the laminar vessel 68. When the push button assembly is depressed, the ridge 104 disengages the one of the plurality of detents 102. Releasing the push button assembly returns the ridge 104 to its engaged position.

Accordingly, a user can adjust the angle Θ of the column of water 26 exiting the laminar water feature 10 by depressing the push button assembly 92, selecting another one of the plurality of detents 102 of the adjustment band 96, and releasing the push button assembly 92, thus rotating the laminar vessel 68 about the axis 100 through the pivot projections 86 and varying the maximum height y and maximum throw x of the column of water 26. In a preferred embodiment, the selection of an adjacent one of the plurality of detents 102 provides for a rotational translation in increments of 2 degrees. Preferably about seven (7) detents 102 are provided on the adjustment band 96, providing for a rotational translation of about 14 degrees. While a greater number of detents 102 could be provided, it is desirable to limit the maximum rotational translation of the laminar vessel 68 so as to prevent the laminar vessel 68 and/or the column of water 26 from contacting the interior of the housing 28.

Figure 6:
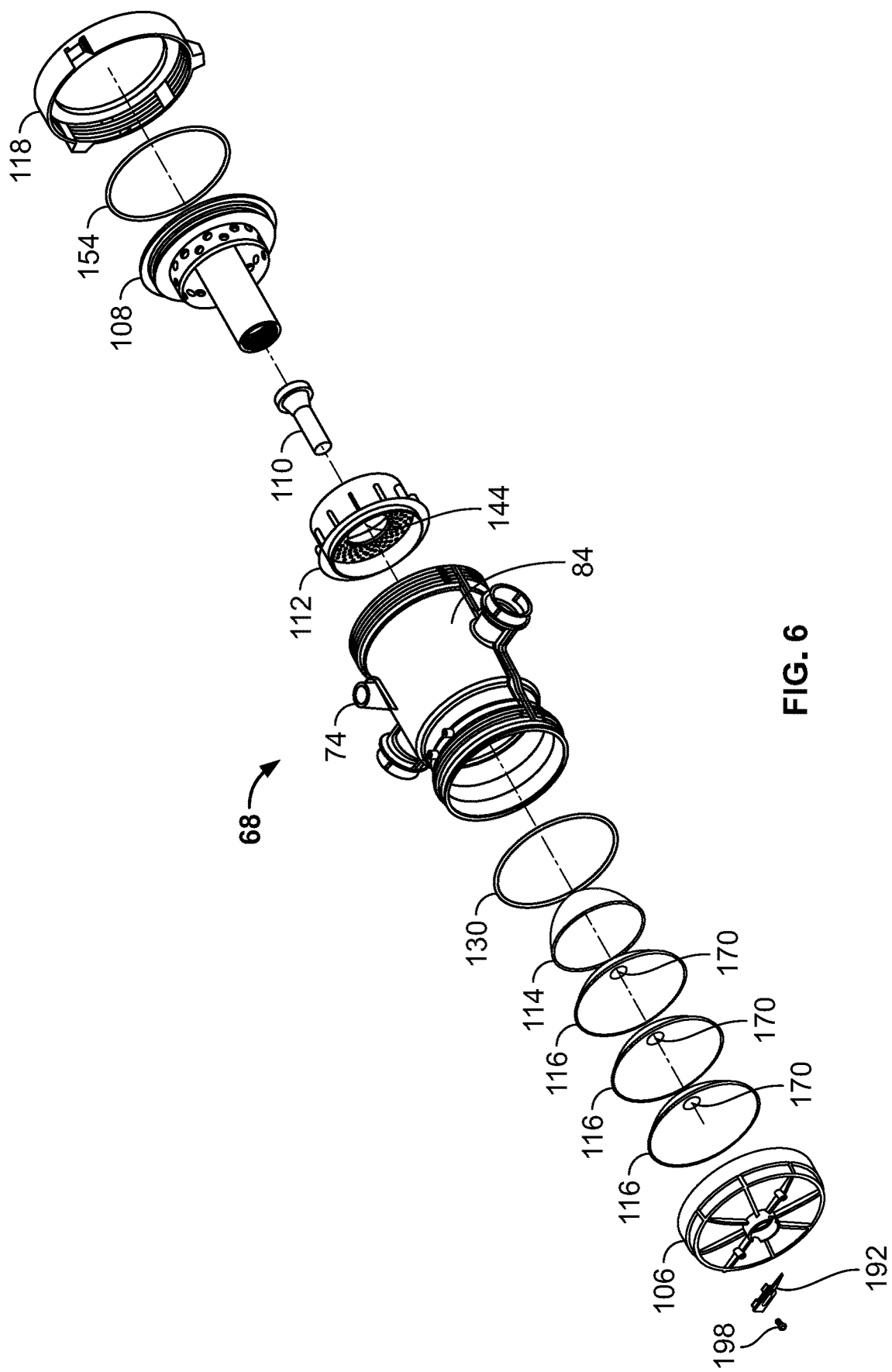
FIG. 6 is an exploded view of the laminar vessel of FIG. 5.
Figure 7:
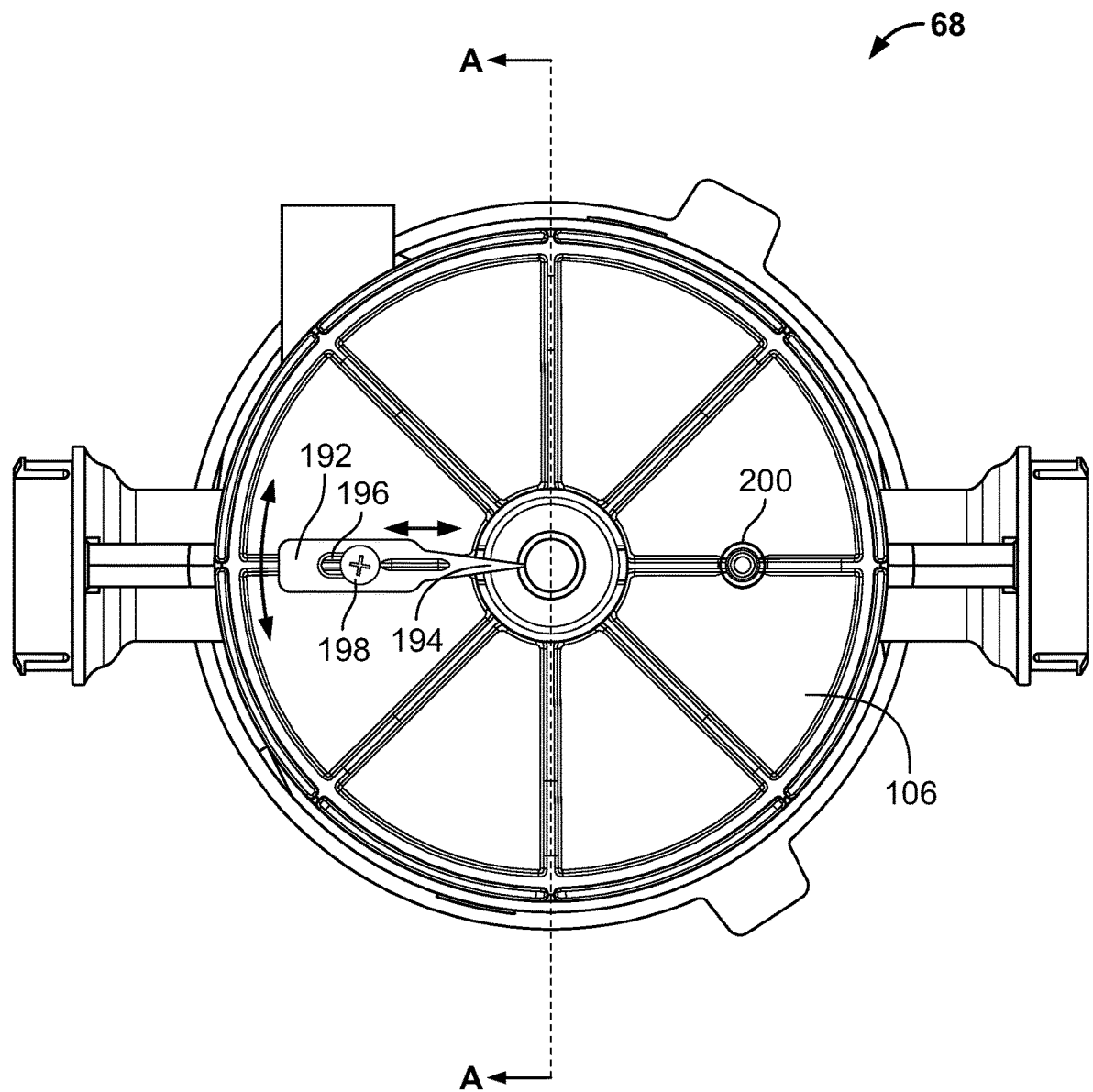
FIG. 7 is a top view of the laminar vessel of FIG. 5.
Figure 8:
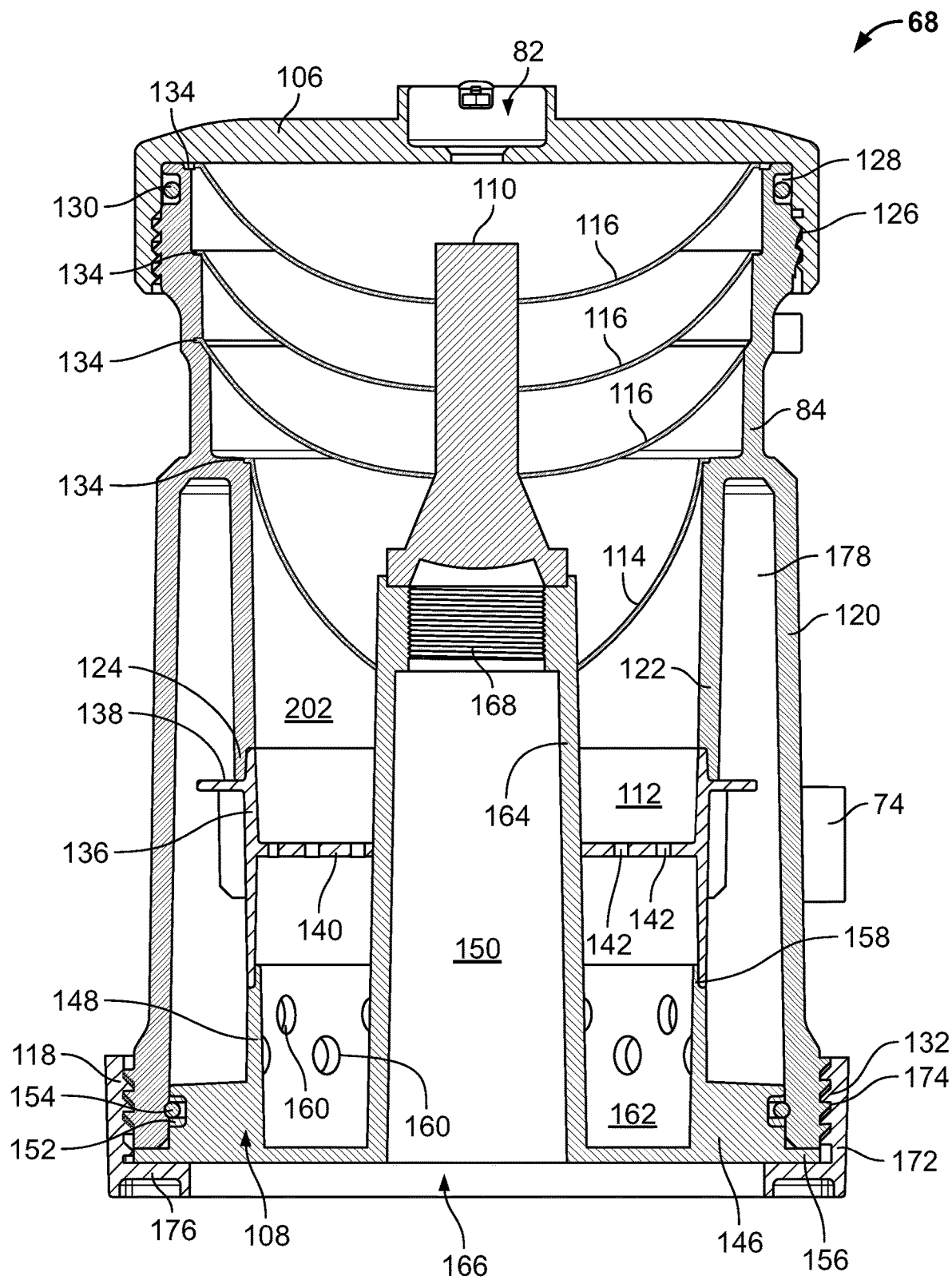
FIG. 8 is a cross-sectional view (taken along line A-A of FIG. 7) of the laminar vessel of FIG. 5.

FIG. 6 is an exploded view of the laminar vessel 68 of the present disclosure, FIG. 7 is a top view of the laminar vessel 68 of FIG. 6, and FIG. 8 is a cross-sectional view of the laminar vessel 68 (taken along line A-A of FIG. 7). Accordingly, FIGS. 6-8 will be referred to jointly. The laminar vessel 68 includes a body 84, a cap 106, a bottom seal plate 108, a light pipe 110, an upper baffle member 112, a lower screen 114, a plurality of upper screens 116, and a union ring 118.

The body 84 is generally cylindrical in design defining a central plenum 202 and includes an outer wall 120 and an inner wall portion 122 having a shoulder 124. The inlet 74 is disposed through the outer wall 120 and is adjacent to the inner wall portion 122. As seen in FIG. 8, the body 84 includes an upper threaded portion 126 and an upper annular groove 128 to receive a first o-ring 130, the upper threaded portion 126 and the first o-ring 130 threadably and sealingly engaging the cap 106 of the laminar vessel 68. The body 84 also includes a lower threaded portion 132 for engaging the union ring 118. The interior of the of the body 84 adjacent the cap 106 includes a series of tiered shoulders 134 for retaining and supporting the upper screens 116 and lower screen 114, discussed hereinbelow.

The cap 106 includes an outlet 82 for producing a substantially laminar column of water 26, and threads for engaging the upper threaded portion 126 of the body 84, as described above.

The upper baffle member 112 includes an annular wall 136, a flange 138 disposed around the annular wall 136, and a horizontal secondary baffle 140 having a plurality of apertures 142. The upper baffle member 112 also includes a main aperture 144 (see FIG. 6) therethrough for receiving the bottom seal plate 108, discussed hereinbelow.

The bottom seal plate 108 includes a base 146, an outer annular wall 148 and a light chamber 150. The base 146 includes a lower annular groove 152 for receiving a second o-ring 154, and a flange 156. The outer annular wall 148 includes a shoulder 158 and plurality of apertures 160, forming a vertical sleeve baffle 162. The light chamber 150 is generally cylindrical and includes a continuous wall 164 which is formed concentrically about an aperture 166 in the base 146. As seen in FIG. 8, threading 168 is provided on the interior of the light chamber 150 on an end opposite the base 146.

The light pipe 110 is formed from a material selected to transmit light therethrough. The light pipe 110 material can be a clear or colored fiber-optic material, glass, plastic, or any other suitable material capable of sustaining clarity upon prolonged exposure to a chlorinated environment, or the like. The light pipe 110 is sealingly affixed to and in optical communication with the end of the light chamber 150 opposite the base 146 of the bottom seal plate 108. The light pipe 110 is preferably sealingly affixed to the light chamber 150 by way of ultrasonic welding. However, other methods of sealingly affixing the light pipe 110 to the light chamber 150 can be used so long as a liquid-tight seal is provided therebetween.

As seen in FIG. 8, the lower screen 114 and the upper screens 116 are of a general domed curvature design (e.g., having substantially parallel concave and convex surfaces) having openings 170 allowing for the light pipe 110 and continuous wall 164 of the light chamber 150 to pass therethrough. Wile the domed curvature is preferably provided upon installation of the screens, the domed curvature can also be formed upon manufacturing of the upper screens 116 and lower screen 114. For example, in a preferred embodiment the upper screens 116 and lower screen 114 are die-cut from sheets and then formed into the domed design upon installation into the laminar body 84 as they are fitted around the light pipe 110 and continuous wall 164 of the bottom seal plate 108. Alternatively, the upper screens 116 and the lower screen 114 could be a polymeric or metallic mesh that has been formed over a domed mandrel upon manufacturing. Further, the screens 114, 116 can be manufactured from any material that is able to withstand prolonged exposure to a chlorinated environment such as that found in a typical residential or commercial pool or spa. It should be understood by one of ordinary skill in the art that variations in geometry, number, and placement of the upper screens 116 and lower screen 114 are contemplated as within the scope of the invention.

The body 84, the cap 106, the bottom seal plate 108, the light pipe 110, the upper baffle member 112, the lower screen 114, the plurality of upper screens 116, and the union ring 118 are assembled as described hereinbelow and seen in FIG. 8. The laminar body 84 receives the upper baffle member 112, the bottom seal plate 108, and the light pipe 110. As described hereinabove, the light pipe 110 and bottom seal plate 108 are sealingly affixed so that a liquid-tight seal is provided therebetween. The annular wall 136 adjacent the flange 138 of the upper baffle member 112 is received by the shoulder 124 of the inner wall portion 122 of the laminar body 84 and further support is provided by the flange 138 directly abutting the inner wall portion 122. The light chamber 150 of the bottom seal plate 108 and the light pipe 110 are concentrically positioned through main aperture 144 of the upper baffle member 112. Further, the annular wall 136 of the upper baffle member 112 is aligned with and received by the shoulder 158 of the baffle wall 148 of the bottom seal plate 108. The lower annular groove 152 of the base receives the second o-ring 154 which contacts an inner surface of the outer wall 120 of the laminar body 84 and the flange 156 of the bottom seal plate 108 contacts the outer wall 120 adjacent the lower threaded portion 132 as seen in FIG. 8. The union ring 118 having an annular wall 172 with threads 174 and a lip 176 is threadably secured to the lower threaded portion 132 of the laminar body 84 providing a water-tight seal. It is noted that the outer wall 120 and inner wall portion 122 of the laminar body 84, annular wall 136 of the upper baffle member 112, and baffle wall 148 and base 146 of the bottom seal plate 108 define an annular pocket 178 adjacent the water inlet 74. The openings 170 of the lower screen 114 and upper screens 116 are disposed about the light pipe 110 and light chamber 150, as described above, and the upper screens 116 and lower screen 114 are supported by the tiered shoulders 134 of the laminar body 84. The upper annular groove 128 of the laminar body 84 receives the first o-ring 130, the upper threaded portion 126 and the first o-ring 130 threadably and sealingly engaging the cap 106 of the laminar vessel 68, creating a watertight seal therebetween. It is noted that the configuration described hereinabove provides for the light chamber 150 being completely isolated from the interior of the laminar vessel 68 and is accessible through the central aperture 166 in the bottom seal plate 108.

Figure 9:
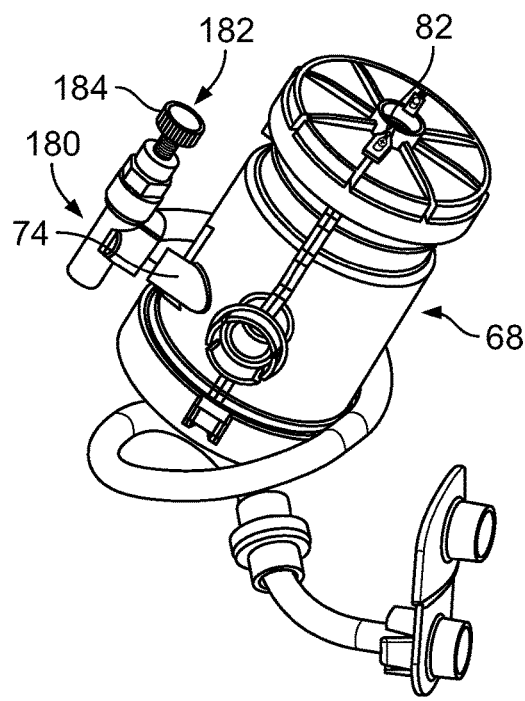
FIG. 9 is a perspective view of the laminar vessel of FIG. 5 further including an adjustable valve.

FIG. 9 is a perspective view of the laminar vessel 68 of the present disclosure further including an adjustable valve 180 for adjusting the volumetric flow rate of the laminar water feature 10. As shown in FIG. 9, the adjustable valve 180 is coupled to the inlet 74 of the laminar body 84. The adjustable valve 180 includes an adjustment means 182 for varying the volumetric flow rate of the adjustable valve 180. The embodiment shown in FIG. 9 utilizes an adjustable thumb screw 184 that can be rotated clockwise and/or counter clockwise to control the overall volumetric flow rate of fluid entering the laminar vessel 68, thereby controlling the overall volumetric flow rate of fluid exiting the outlet 82 of the laminar water feature 10, and thereby controlling the maximum height y and maximum throw x of the column of water 26 at a given angle Θ. A thumb screw 184 is the preferable adjustment means 182 for the adjustable valve 180, the thumb screw providing for adjustment of the volumetric flow rate of the laminar water feature 10 without the use of additional tools, having to turn off the laminar water feature 10, or having to remove it from the housing 28. Although the embodiment shown in FIG. 9 illustrates the use of a thumb screw 184 for adjustment of the valve 180, it should be appreciated that many alternate adjustment means are possible. For example, the valve 180 may employ a tool-actuated screw, lever, electrically controlled servo, solenoid, or other actuators to adjust the flow rate without departing from the present disclosure.

Figure 10:
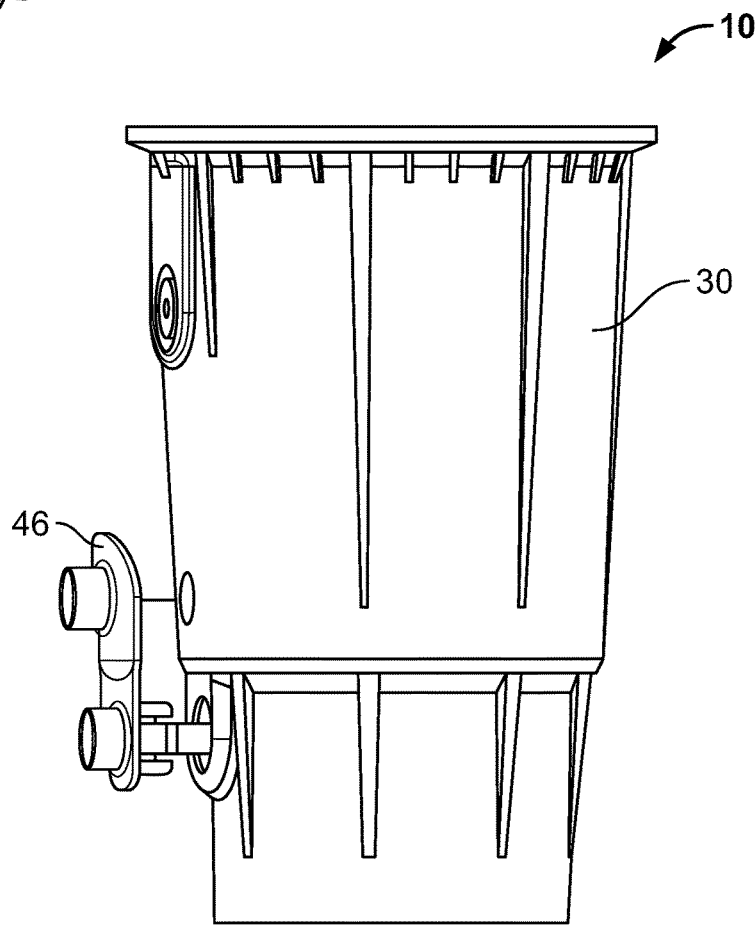
FIG. 10 is a perspective view of the laminar water feature of FIG. 1 illustrating placement of an adapter.

FIG. 10 is a perspective view of the laminar water feature 10 illustrating placement of the adapter 46 that can be inserted into the deck niche 30 by way of a snap fit for accepting water conduit 22 (not shown) and electrical conduit 24 (not shown) of varying diameters.

Figure 11:
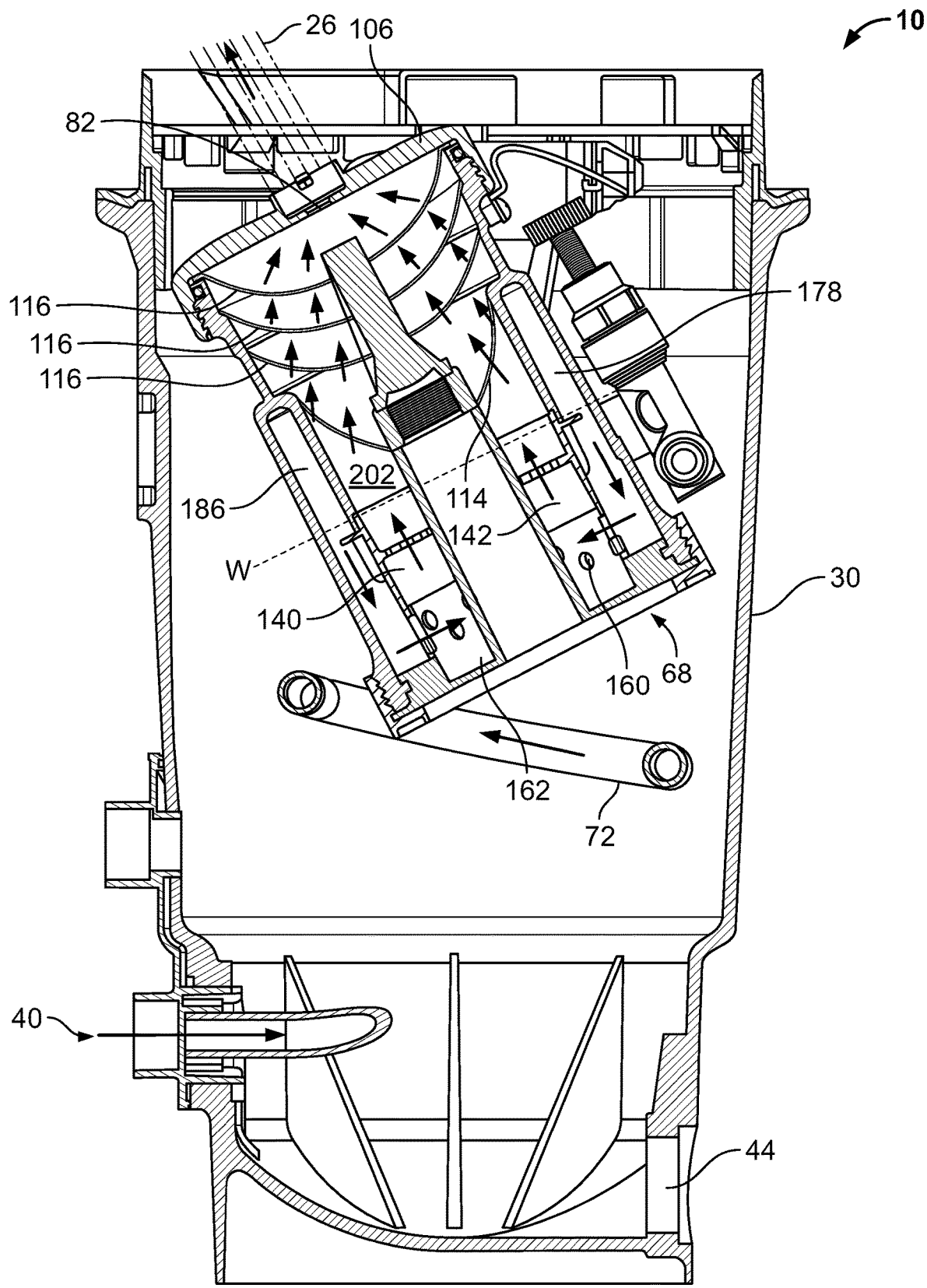
FIG. 11 is a cross-sectional view (taken along line B-B of FIG. 2) of the laminar water feature of FIG. 1.

FIG. 11 is a cross-sectional view (taken along line B-B of FIG. 2) of the laminar water feature 10 of the present disclosure in operation. Water flow can be visualized as following a path illustrated by the directional arrows in FIG. 11. Generally turbulent water is provided to the laminar water feature 10 via the water conduit 22 (not shown), passing through water conduit entry port 40 of the deck niche 30 and through the flexible hose 72 before entering the valve 180. As discussed above, the valve 180 controls the volumetric flow rate of the water as it enters the laminar vessel 68. After passing through the valve 180, the water enters the laminar vessel 68 through the inlet 74 in the laminar body 84 at a tangential angle so that the water is directed circumferentially around the annular pocket. The tangential entry of inlet 74 is also shown in FIG. 9. An additional benefit of the tangential entry of inlet 74 is that the flexible hose 72 is kept tightly coiled around the laminar vessel 68 without restricting the positioning of the laminar vessel 68 (see FIG. 9).

It is noted that an air pocket 186 is formed in the annular pocket 178 above dashed line w as shown in FIG. 11. The air pocket 186 serves two functions. First, the air pocket 186 provides an insulative and sound deadening effect thereby reducing and/or deadening any perceptible sound to those in the general area of the laminar water feature 10. Second, the air pocket 186 serves to dampen any pressure variations within the laminar vessel 68 (e.g. air pockets within the water conduit 22), reducing the turbulence of the water.

After circulating in the annular pocket 178, the water passes through the apertures 160 of the vertical sleeve baffle 162, thereby further reducing the turbulence of the water.

Next, the water passes through the apertures 142 of the horizontal secondary baffle 140 into the central plenum 202 thereby further reducing the turbulence of the water. The water then passes through the lower screen 114 and the upper screens 116, respectively, straightening and developing the flow towards the outlet 82 and thereby substantially eliminating any remaining turbulent flow in the water. Finally, the water is forced through the outlet 82 of the cap 106, thereby producing a laminar column of water 26 as it exits the laminar water feature 10.

Figure 12:
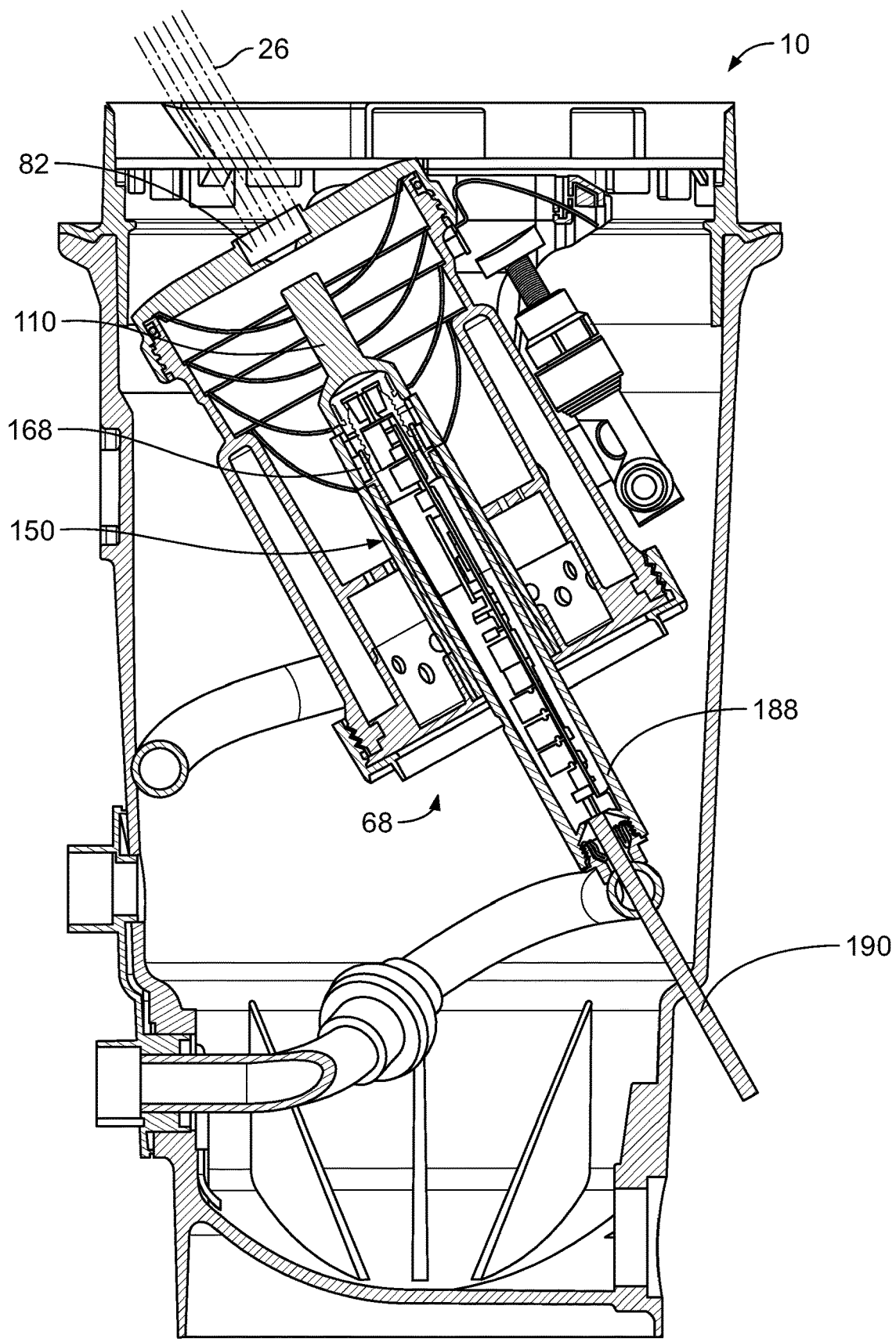
FIG. 12 is a cross-sectional view (taken along line B-B of FIG. 2) of the laminar water feature according to the present disclosure further including a lighting source.

FIG. 12 is a cross-sectional view (taken along line B-B of FIG. 2) of the laminar water feature 10 further including a lighting source 188. In some embodiments the laminar water feature 10 includes a lighting source 188 for illuminating the laminar column of water 26 as it exits the laminar water feature 10 and terminates in the body of water 14. Preferably, the lighting source 188 provides illumination by way of light emitting diodes ("LEDs"), however other embodiments can provide illumination by way of halogen, incandescent, and digital light processing. Exemplary embodiments of the lighting source 188 include Hayward® ColorLogic® 320 and 160 LED lights. In some embodiments the lighting source 188 may be electrically coupled to a controller and/or synchronization system (not shown) so as to operate as part of a larger lighting system. For example, a controller may synchronize color, intensity, and operation of a plurality of laminar water features 10 as well as other lighting features thereby providing a pleasant and aesthetically pleasing atmosphere surrounding a residential or commercial pool or spa.

As shown in FIG. 12, the lighting source 188 is disposed within the light chamber 150 and is removably engaged with the threading 168 within the light chamber 150. As discussed above, the light chamber 150 is isolated from the interior of the laminar vessel 68 thereby protecting the lighting source 188 from exposure to water within the laminar vessel 68. The lighting source 188 receives power and/or control signals by way of an electrical supply line 190 that can be coupled to the electrical conduit 24 or any other low voltage power source suitable for providing power to the lighting source 188. During operation, the light pipe 110 directs light from the lighting source 188 to an area directly adjacent to the outlet 82 of the laminar vessel 68, thereby imparting illumination to the laminar column of water 26 just prior to exiting the laminar water feature 10.

Referring back to FIG. 7, a top view of the laminar vessel 68 is shown having a laminar scratcher 192. As discussed above, the substantially laminar column of water 26 exiting the laminar water feature 10 has a uniform, smooth, glass-like appearance. Because of this, light imparted into the column of water 26 travels therethrough with ease, similar to the operation of a fiber-optic cable. As a result of these fiber-optic properties, light may not scatter away from the direction parallel to the flow of the laminar column of water 26, producing a transparent and/or non-illuminated appearance. Accordingly, in some embodiments, the cap 106 of the laminar vessel 68 is provided with a laminar scratcher 192 as shown in FIG. 7. The Laminar scratcher 192 disrupts the surface of the laminar column of water 26, thereby increasing the angular scatter of the light and increasing opacity and/or perceived illumination of the column of water 26.

The laminar scratcher includes point 194, and an elongate channel 196. As shown in FIG. 7, the laminar scratcher is coupled to the cap 106 of the laminar vessel 68 by way of a screw 198 inserted through the elongate channel 196, the screw being received by a mounting point 200 disposed in the cap 106. While two (2) mounding points 200 are shown in FIG. 7, any number of mounting points may be provided on the cap 106. As shown by the double sided arrows of FIG. 7, the laminar scratcher 192 can be rotated about the screw 198 and translated along the elongate channel 196 to achieve a desired amount of surface disruption. While a screw 198 is shown in FIG. 7 any other suitable means allowing for rotation and translation of the laminar scratcher 192 may be used to couple the laminar scratcher 192 to the cap 106.

Figure 13:
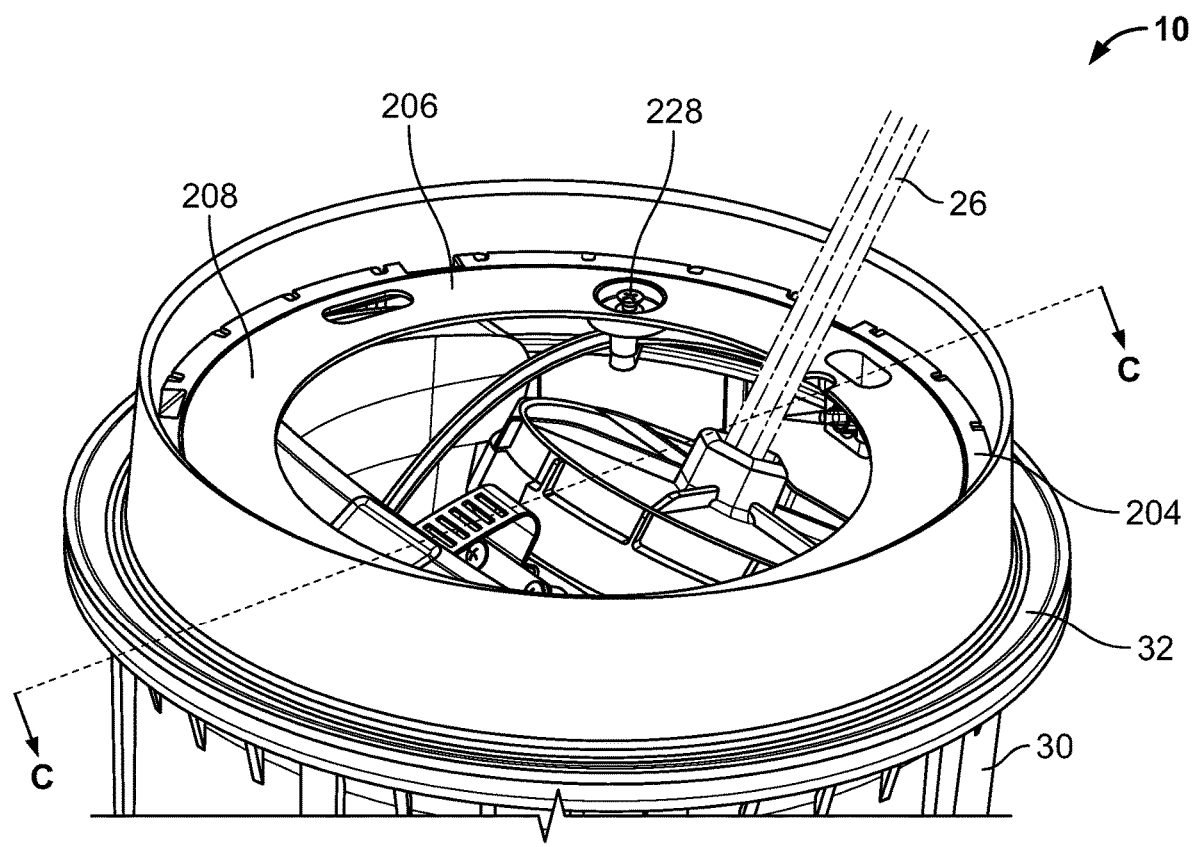
FIG. 13 is a partial perspective view illustrating another aspect of the laminar water feature according to the present disclosure.
Figure 14:
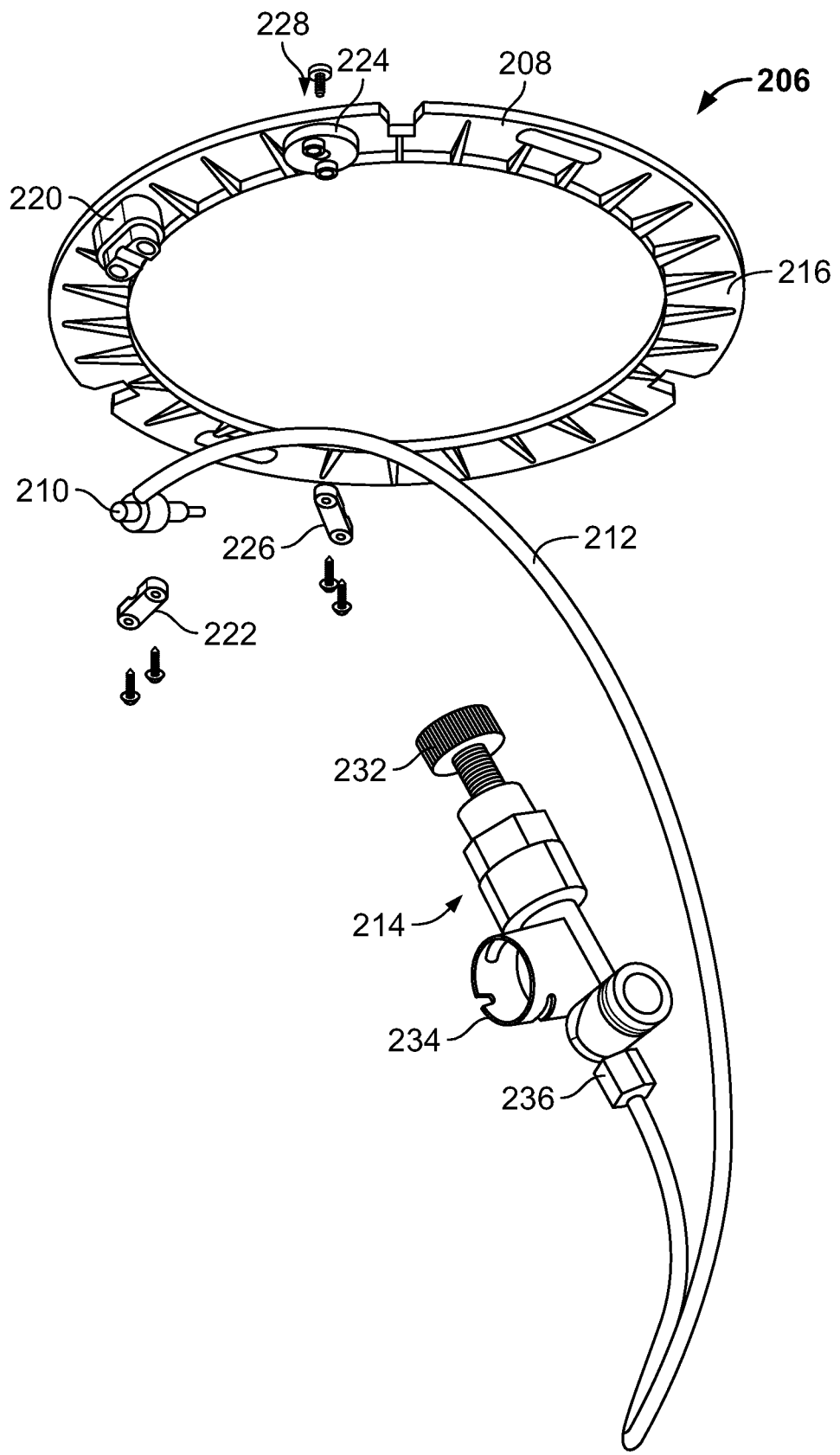
FIG. 14 is a partial exploded view of the laminar water feature of FIG. 13.

FIG. 13 is a partial perspective view illustrating another aspect of the laminar water feature according to the present disclosure. As discussed in connection with FIG. 7, the fiber-optic properties of the laminar column of water 26 may produce a transparent and/or non-illuminated appearance. According to some aspects of the present disclosure a laminar flow disruption assembly, indicated generally at 206, is provided which disrupts the surface of the laminar column of water 26 by injecting a thin stream of water into the laminar column of water 26. FIG. 14 is a partial exploded view showing components of the laminar flow disruption assembly 206, FIG. 15 is a detailed view of the laminar flow disruption assembly 206, and FIG. 16 is a partial cross-sectional view (taken along line C-C of FIG. 13) of the laminar water feature of FIG. 13.

As illustrated in FIG. 14, the laminar flow disruption assembly 206 includes a support ring 208, a nozzle 210, a tube 212, and an adjustable valve 214. The support ring includes an upper side 216, an underside 218, a nozzle fixation means 220, and an adjustment means 224 for regulating flow to the nozzle 210.

Similar to the adjustable valve 180 discussed hereinabove in connection with FIG. 9, the adjustable valve 214 includes an adjustment means such as, for example, an adjustable thumb screw 232, a primary outlet 234 for providing water to the laminar vessel 68 (not shown), and a secondary outlet 236 for providing water to the nozzle 210. As shown in FIG. 14, a first end of the tube 212 is affixed to the nozzle 210 and a second end of the tube 212 is affixed to the secondary outlet 236 of the adjustable valve 214, thereby providing fluid communication between the nozzle 210 and the adjustable valve 214.

Figure 15:
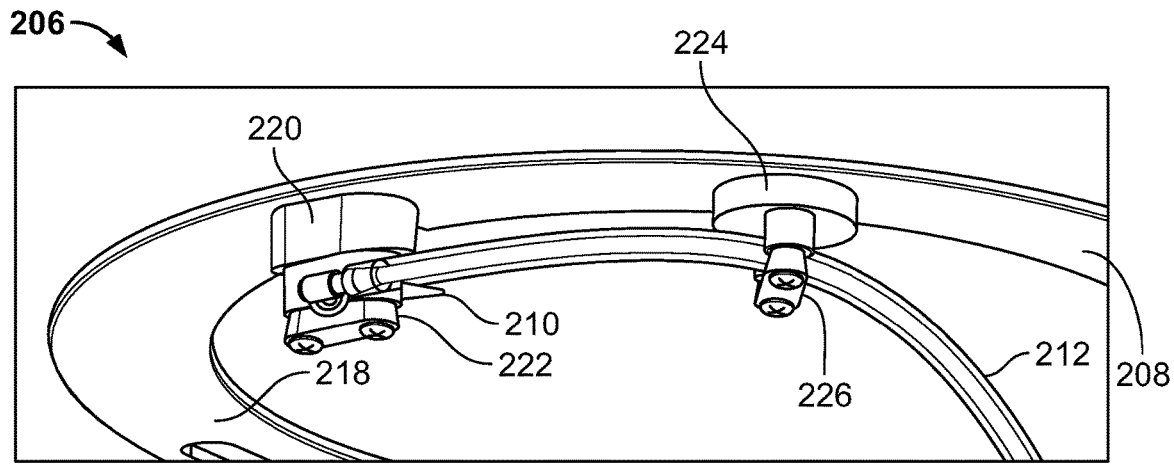
FIG. 15 is an enlarged perspective view of the laminar water feature of FIG. 13.
Figure 16:
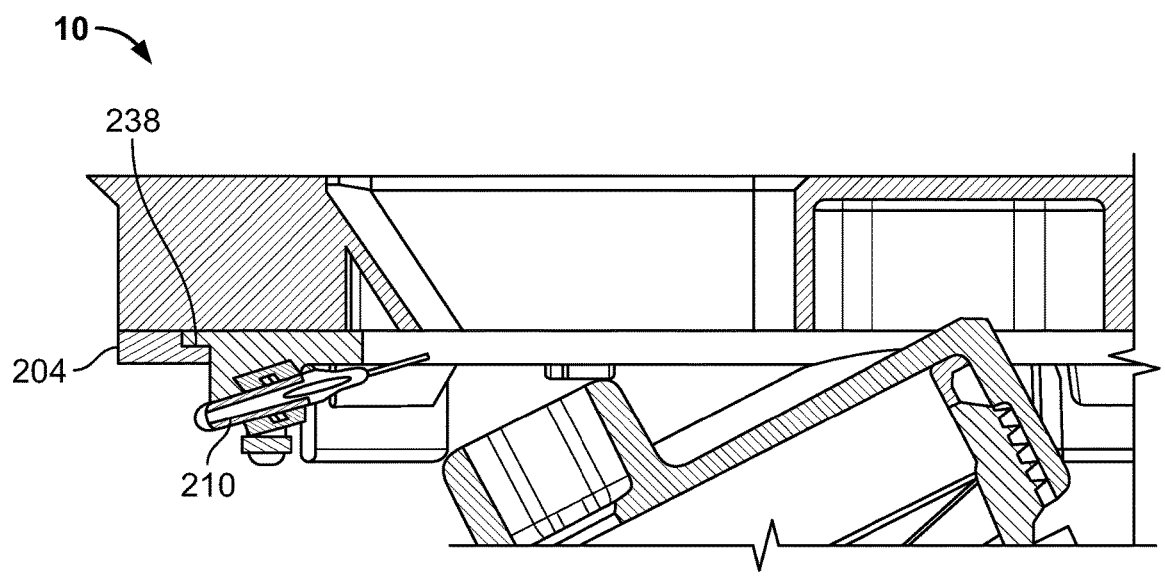
FIG. 16 is a partial cross-sectional view (taken along line C-C of FIG. 13) of the laminar water feature of FIG. 13.

As illustrated in FIG. 15, the nozzle fixation means 220 could include a support member 222 for securing the nozzle 210 against the underside 218 of the support ring 208. The adjustment means 224 for regulating flow to the nozzle 210 could include a support member 226 and a screw 228 threadably disposed through the support ring 208. As shown in FIGS. 13 and 15, the tube 212 could be disposed between support member 226 and the screw 228. The screw 228 can be rotated clockwise or counterclockwise, restricting or permitting water to flow through the tube 212, providing adjustment of the stream of water that is injected into the laminar column of water 26, and thereby providing adjustment of the amount of surface disruption to the laminar column of water 26. Although the embodiment shown in FIGS. 13-15 illustrate the use of screw 228 for adjusting flow through tube 212, it should be appreciated that many alternate adjustment means are possible. For example, the adjustment means 224 may employ a thumb screw, lever, electrically controlled servo, solenoid, or other actuators to adjust the flow without departing from the present disclosure.

As illustrated in FIGS. 13 and 16, the laminar water feature 10 could be provided with a spacer ring 204 that is configured to engage the niche collar 32, similar to spacer ring 34, discussed hereinabove in connection with FIG. 4. Spacer ring 204 could be provided with an annular flange 238 for receiving support ring 208. Spacer ring 204 could be configured to freely rotate about flange 238, or spacer ring 204 could be non-rotatably affixed to spacer ring 204.

The present disclosure also relates to a method for adjusting the maximum height y and maximum throw x of the laminar water feature 10. The method includes the steps of removing the lid 36 of the housing 28, activating the laminar water feature 10, rotating the laminar vessel 68 so that the column of water 26 is directed toward a desired point of termination, adjusting the valve 180 to achieve a desired volumetric flow rate of the laminar column of water 26, adjusting the angle Θ of the laminar vessel 68 by depressing the push button assembly 92 on the handle 90 of the pivot adjustment bracket 70, rotating the laminar vessel 68 to a desired angle Θ, and releasing the push button assembly 92 thereby selecting a detent 102 of the adjustment band 96, repeating the steps of adjusting the valve 180 and adjusting the angle Θ until a desired maximum height y and maximum throw y are achieved, deactivating the laminar water feature 10, replacing the lid 36 of the housing 28 by aligning and then inserting the alignment posts 64 with/in the alignment features 80 of the pivot adjustment bracket 70, and finally reactivating the laminar water feature 10. It is noted that is not necessary to deactivate the laminar water feature 10 to perform the steps of the above method. However, it may be desirable for a user performing the method to do so, so as to not interrupt the column of water 26 by removing the lid 36, thereby causing water to be splashed in the general area of the laminar water feature 10 and the user.

Although the foregoing disclosure was discussed in connection generally with pools and spas, it is to be understood that the systems and methods disclosed herein could be utilized in connection with any body of water where a laminar water feature 10 is desired.

Having thus described the invention in detail, it is to be understood that the foregoing description is not intended to limit the spirit or scope thereof. It will be understood that the embodiments of the present invention described herein are merely exemplary and that a person skilled in the art may make any variations and modification without departing from the spirit and scope of the invention. All such variations and modifications, including those discussed above, are intended to be included within the scope of the invention.

What is claimed is:

1. A laminar water feature comprising:
    a body having a water input and an annular wall defining a central plenum, the water input disposed through an outer wall of the body;
    a cap having an outlet for producing a laminar column of water, the cap sealingly affixed to a top of the body;
    a light chamber disposed within the central plenum and in optical communication therewith, the light chamber removably receiving a light source and wherein the light chamber is in water-tight isolation from the central plenum;
    a plurality of screens disposed within the central plenum for reducing turbulence of water passed therethrough;
    a housing having a deck niche and a lid, the height of the lid being adjustable relative to the deck niche; and
    a niche collar disposed on the deck niche, the niche collar having a plurality of adjustment notches disposed circumferentially about the collar, the adjustment notches being of at least two distinct heights.

2. The laminar water feature of claim 1,
    wherein the light source illuminates the laminar column of water produced by the water feature; and wherein a bottom seal plate further comprises a vertical sleeve baffle having a plurality of apertures for reducing turbulence of water passed therethrough.

3. The laminar water feature of claim 2, wherein the light chamber is formed by the bottom seal plate having annular walls, the bottom seal plate being sealingly affixed to a bottom of the body.

4. The laminar water feature of claim 3, wherein the light chamber is accessible through an aperture in the bottom seal plate, from an exterior of the laminar water feature.

5. The laminar water feature of claim 1, further comprising a light pipe affixed to annular walls of the light chamber, the light pipe in optical communication with the light chamber and with the central plenum.

6. The laminar water feature of claim 2, further comprising a horizontal baffle member having a plurality of apertures for reducing turbulence of water passed therethrough, the horizontal baffle member being disposed around annular walls of the light chamber.

7. The laminar water feature of claim 6, further comprising a union ring having an annular wall with threading for sealingly engaging the body with the bottom seal plate, the union ring threadably engaging threading on the bottom of the body adjacent the bottom seal plate.

8. The laminar water feature of claim 7, wherein the water input is disposed through the outer wall of the body at an angle tangential to the outer wall of the body.

9. The laminar water feature of claim 1, further comprising an adjustable valve having an adjustment means for varying the volumetric flow rate of water passed therethrough, the adjustable valve coupled to and in fluid communication with the water input of the body.

10. The laminar water feature of claim 1, further comprising a laminar scratcher for disrupting a surface of the laminar column of water, the laminar scratcher having a point and an elongate channel, the laminar scratcher being adjustably mounted on the cap of the laminar water feature and contacting the surface of the laminar column of water.

11. The laminar water feature of claim 1, comprising:
an adjustable bracket rotatably secured to the body of the laminar water feature and disposed within the housing; and
wherein the adjustable bracket further comprises a push-button assembly for selectively adjusting an angle of the laminar column of water relative to the housing.

12. The laminar water feature of claim 1, comprising:
a spacer ring having a plurality of increment posts extending therefrom, the lid being supported on a top surface of the spacer ring, the increment posts being receivable by the adjustment notches of the niche collar.

13. The laminar water feature of claim 1, wherein the light chamber is threaded to removably receive the light source.

14. The laminar water feature of claim 1, wherein the light source is an LED device.

* * * * *